United States Patent Office 3,532,515
Patented Oct. 6, 1970

3,532,515
FLAVORING SUBSTANCES AND
THEIR PREPARATION
James J. Broderick, River Edge, N.J., and Seymour A. Marcus, Brooklyn, N.Y., assignors to H. Kohnstamm & Company, Inc., New York, N.Y., a corporation of New York
No Drawing. Filed June 2, 1967, Ser. No. 643,033
Int. Cl. A23l 1/22
U.S. Cl. 99—140                16 Claims

ABSTRACT OF THE DISCLOSURE

Preparation of an artificial flavoring by reacting at elevated temperatures a ribose moiety containing substance, preferably a nucleotide, with an amino acid selected from the group consisting of cystine and cysteine in the presence of water until all of the water initially present has been removed and the product is present as a dried friable mass having the aroma and taste of cooked meat. Specific aldehydes in combination with methyl sulphide may thereafter be added to produce a chicken meat flavor.

---

The present invention generally relates to an improvement in the synthesis of flavors and flavoring ingredients.

The method of preparation of the flavor product basically involves reacting the aforesaid ingredients in the presence of water at an elevated temperature until a flavoring substance having the aroma and taste of cooked meat is obtained. The amount of water involved in the reaction is of sufficient quantity to wet the reactants but comprises any amount of water for each part of amino acid present in the reaction mixture. The optimum ratio of water to amino acid is 19:1. The reaction temperature will vary from 60° C. to about 200° C. The reaction will normally proceed until all of the water initially present has been removed and the flavor product is present in the reaction vessel as a dried friable mass.

BACKGROUND OF THE INVENTION

In general, it has been known in the prior art how to prepare artificial flavoring substances which impart a savory taste or smell to foodstuffs and particularly those flavors which impart a meat-like flavor. In the past it has been taught as disclosed in U.S. Pats. 2,934,436, 2,- 934,435 and 2,918,376 to react various materials to obtain a meat-like flavor. For example, it is suggested by the disclosure of U.S. Pat. 2,934,436 to react an amino acid such as cystine or cysteine with glyceraldehyde in the presence of water and at elevated temperatures in order to obtain a flavor product. To achieve flavors having a particular resemblance to meat, certain pentoses such as ribose are generally included in the reaction to hasten or catalyze amino acid degradation.

In the reaction of low molecular weight aldehydes, or aldehydes that represent sugar fragments (such as glyceraldehyde and the like) with amino acids to degrade the latter, the reaction frequently yields final products having an undesirable off-flavor due to their dehydration or polymerization resulting in partially reacted or unreacted end products of undesirable flavor. When sugars such as pentoses, hexoses or polysaccharides are added to assist in the catalysis of the amino acid reactant, burnt or caramel-like flavors are frequently developed as a result of sugar decomposition products formed therein as well as caramelization. These side reactions limit the use of the flavor and detract from the basic meaty flavor or character of the product. The caramelization side reaction has particularly been for a very long time a stumbling block in attempts at development of meaty flavors, since the off-flavor development resulting therefrom almost always imposes strict limitations on the techniques employed for the control of flavor development. The present invention is particularly useful in that it overcomes these difficulties of the prior art and provides for the first time a technique of flavor development free of such side reactions.

It is an object of the present invention to provide a process for the preparation of an artificial flavoring substance which comprises reacting a ribonucleotide with a suitable amino acid in the presence of water and at an elevated temperature.

It is a more specific objective of the invention to provide a new process for the preparation of an artificial meat flavor (which comprises reacting an amino acid selected from the group consisting of cysteine and cystine with a ribonucleotide) and the novel reaction product which results from such method.

THE INVENTION

In accordance with the present invention it has been found that flavoring substances capable of imparting to foodstuffs a savory meat-like aroma and taste, especially resembling that of cooked meat, may be obtained by the reaction of certain materials containing a ribose moiety as part of their structure with an amino acid reagent, which may compromise one or more amino acids. In general, the reaction in question takes place in the presence of water at elevated temperatures.

The invention involves any reactant containing a ribose moiety and is not specifically limited to a reaction involving ribonucleotides. The reaction is optimally conducted however employing a ribonucleotide as one of the reactants. The amino acid reactant is optimally an amino acid selected from the group consisting of cystine and cysteine, although for the development of certain types of meat flavors additional amino acids may be added in the form of commercial synthetic amino acids or naturally occurring protein hydrolysates, which will release amino acids in the course of the reaction.

The ribonucleotide reactant which is involved in the preparation of the flavor product may be selected from a large number of such materials such as inosinates, guanylates, other ribonucleotides, combinations of these, or products containing such nucleotides or combinations of natural products containing nucleotides as well as synthetic nucleotide materials.

Cysteine, cystein-derivatives or amino acid mixtures having a high percentage of cysteine are the preferred source of amino acid. A particularly preferred flavor is obtained when cysteine or derivatives such as the hydrochloride salt thereof predominates in the amino acid mixture if in fact a mixture of amino acids is employed.

It has been found that the ratio of the ribonucleotide reactant to amino acid reactant is a determining factor in the development and optimum flavor and, in general, the useable ratio of ribonucleotide broadly defined ranges from 0.1–4.0 parts by weight of ribonucleotide reactant to one part by weight of the primary amino acid reactant. By varying the ratios of reactive ingredients employed, the ultimate flavor character changes. This result is a distinct advantage of the invention as one is able to thereby approximate the particular flavor of various types and species of meat as may be desired in the particular situation. In many instances, as little as 0.5 to 1.5 parts of ribonucleotide for one part of cysteine is sufficient to develop a savory or meat-like flavor in the ultimate product. The excess of ribonucleotide may, however, be added for its own inherent flavor. It is the inherent flavor-enhancing properties of the nucleotides that is partly responsible for the development of its superior flavor by the application of the improved process of the invention as contrasted with those methods of the prior art which employed those known amino acid degradation agents such as the pentoses, hexoses and aldehydes as noted above. An ideal ratio, for example, of cysteine to ribonucleotide reactant when used alone has been found to be 1.0 part of cysteine hydrochloride monohydrate to 2.3 parts by weight of a 50/50 mixture of various nucleotides such as 5'-inosinate and 5'-guanylate or 2.3 parts of either 5'-inosinate or 5'-guanylate alone. It must be understood that the nucleotide reactant of the reaction mixture may be added per se, or as part of a natural product, containing the same, which will release the nucleotide "in situ" during the course of the reaction.

The reaction which comprises the development of the present flavor material will generally take place in the presence of a large amount of water of the order of 30 parts of water for each one part of the amino acid reactant under generally elevated temperature and normal or elevated pressure conditions. The ratio of minimum water to amino acid is about 5 to 1 and the ratio of minimum water to ribonucleotide is about 5 parts to 1.5 parts by weight. The reaction times involved will depend to some extent upon the temperature and pressure of the reaction. A preferred range of reaction temperatures will generally extend between 60° C. and 200° C. and reaction will proceed until the reaction is complete and the water present has been evaporated. In the instant case the liquid is dissipated and a virtually dry friable material remains in the reaction vessel.

The flavor developing reaction may also take place in the presence of the food product in which the savory meat-like flavor is sought to be developed. In this particular instance, the cystine-containing or cysteine-containing amino acid reagent and the ribonucleotide and/or natural materials containing a ribose moiety will act as precursors in the reaction, which ultimately will involve reaction between the ribose moiety of the nucleotide and the amino acid to form the ultimate savory meat-like product or flavor.

An example of the use of the products of this invention may be as part of a seasoning mixture added to various meat products where a supplementary meat or savory flavor is desired. In addition, the flavor ingredient obtained by our unique reaction may be added to processed proteins which have no meat flavor of their own and in which a meat or savory flavor is desired. A very common use is in the canning industry to flavor food products that have been or are to be sterilized or autoclaved, which may result in a loss of some of their natural flavor. Under these conditions the meat-like flavor is developed in the processing of the food product. There are, moreover, food products which are processed by the final user such as dry soup mixes, gravy mixes, and a host of other similar materials wherein the flavor ingredient is incorporated in the mix and upon preparation of the mix the desirable meat flavor is imparted thereto.

By way of explanation of the function of the formation of the meat flavor of the invention, it may be stated generally that cysteine, cystine and other amino acids are degraded to form aromatic materials having a meat-like flavor. The aromatics particularly derived from cysteine will give a basic meat flavor, while the other amino acids such as glycine, alpha or beta alanine, arginine, iso-leucine, threonine, proline, glutamic acid, lysine, aspartic acid, tyrosine, leucine, histidine and valine to mention a few of these will impart a particular meat flavor therein. While it is preferred to use single amino acids in those instances where it is desired to supplement the basic meat flavor of the product, combinations of more than one amino acid may also be used, and the synthetic racemic mixture as well as the naturally occurring dextro or levo forms of the acid may be employed. In some instances, depending upon the particular food product being treated, the supplemental amino acid ingredient may be added in the form of its hydrochloride, or bound up in proteins or polypeptides which will under proper conditions generate the desired amino acids under the conditions of reaction.

As noted above, the reaction involved in the invention may be carried out if desired by simply adding the reagents to a selected food product in which it is desired to develop a meat flavor and then heating the product to effect reaction. One conventional way of proceeding is simply to place the food to be flavored and the flavor reactants in an autoclave and reacting until a proper flavor is attained.

The reaction products of the invention may be separately prepared and subsequently converted to dry powders by such conventional techniques as lyophilization or spray drying. As a flavor additive they may be added to food products in a wide range of proportions extending from about 0.1 to 10.0 percent of the total weight of the food product to which they are added depending upon the nature of the product and the other circumstances which dictate the level of flavor desired.

The flavoring substances of the invention, when independently prepared and incorporated into a wide array of food products may be added as either solutions or dry powders as convenience dictates. These may be used to impart a meaty flavor to artificial food products or may be used to enhance the natural flavor of fresh meat products. The supplemental amino acids give varying specific flavors which are in addition to the basic meat flavors imparted to the food product by the reaction product of ribonucleotide and the cysteine.

The following examples illustrate the preferred mode of operation of our novel method and teach those skilled in the art how to obtain our new flavor product. While these examples disclose only certain species of the nucleotide reactant, it should of course be understood that they are purely included for the purpose of illustrating the principle of the invention. For a proper understanding of the scope of the invention, reference may be made only to the several appended claims. In the following examples the amounts of ingredients employed are in parts by weight unless otherwise designated.

EXAMPLE 1

3.0 grams of cysteine hydrochloride monohydrate, and 30.0 grams of hickory smoked torula yeast were thoroughly stirred in 100 parts of water.

The reaction mixture, in a glass plate, was placed in an oven and the ingredients were allowed to heat between 130°–135° C. for 2½ hours. The yield of crude material was 30.0 grams. The powdered residue has a ham-like taste.

EXAMPLE 2

30 parts of a 50:50 (percent by weight) mixture of commercial disodium guanosine 5'-monophosphate and disodium inosine 5'-monophosphate, 20 parts of cysteine hydrochloride monohydrate, and 100 parts of hickory smoked torula yeast were thoroughly stirred in 400 parts of water. The contents were poured into a large glass plate in an oven set at 130°–135° C. The material was heated until the residue could be powdered. The yield of crude material was 149.0 parts of meat flavor base.

EXAMPLE 3

To a mixture of 40 parts of water, 7.54 parts of cysteine hydrochloride monohydrate and 17.20 of a 50:50 (percent by weight) mixture of commercial, disodium guanosine 5'-monophosphate and disodium inosine 5'-monophosphate was added an emulsion of 40 parts of gum acacia in 100 parts of water. The combination was well-mixed in a blender and spray dried in a commercially available spray drier unit.

The inlet temperature of the atomizer varied from 190°–235° C. The air flow pressure varied from 3 to 5 kg. per square inch.

A yield of 40.2 parts of white powder was obtained which had a savory, chicken-like odor, and an aqueous solution of the material had a mouth-watering, chicken-meat flavor.

EXAMPLE 4

To a 4000 ml. vessel equipped with a stirrer was added 1550 parts of water, 162 parts of commercial, disodium inosine 5'-monophosphate, 108 parts of commercial L-cysteine hydrochloride monohydrate and 540 parts of hickory smoked tortula yeast.

This medium was then added to a large tray and placed in an oven set at 130°–135° C.

After several hours of heating, the dried residue was powdered, giving a yield of 732 parts of material which when dissolved in water produced a savory, meat-like odor and flavor.

EXAMPLE 5

The following combination:

| | Parts |
|---|---|
| 2,4 decadienal | 10 |
| 2,6 nonadienal | 1 |
| Undecanal | 1 |
| Methyl sulfide | 1 | at a level of 0.25–1.0 p.p.m. imparts a "chicken fat" flavor to the meat flavor already prepared.

The addition of proper seasonings (celery, onion, pepper, etc.) and other flavor materials round off or give a roasted character.

What is claimed is:

1. A process for the development of a synthetic meat-flavor which consists essentially of reacting a ribose-moiety-containing ribonucleotide reactant with an amino acid reactant selected from the group consisting of cysteine and cystine in the presence of water until a meat-flavor develops at elevated temperatures.

2. A process according to claim 1 wherein the ribose moiety containing reactant is a ribonucleotide.

3. A process according to claim 1 wherein the reaction is carried out in the presence of water at an elevated temperature above 60° C.

4. A process according to claim 2 wherein the ribonucleotide reactant is derived from a naturally occurring product containing ribonucleotides and other ribose-radical-containing complexes as well as from synthetic ribonucleotides.

5. A process according to claim 1 wherein the amino acid reactant may additionally contain at least one supplemental amino acid.

6. A process according to claim 2 in which the weight ratio of ribonucleotide to amino acid ranges from 1:2 to 3.0:1 by weight.

7. A process according to claim 6 wherein the ratio of minimum water to amino acid is 5:1 by weight and the ratio of minimum water to ribonucleotide is 5:1.5 by weight.

8. A flavoring substance prepared by the process of claim 1.

9. A flavoring substance prepared by the process of claim 2.

10. A flavoring substance prepared by the process of claim 3.

11. A method of imparting a synthetic meat flavor to a food product which consists essentially of admixing with the food product a minor proportion of the reaction product produced by the process of claim 1.

12. A method according to claim 11 in which the food product contains a ribonucleotide as part of its normal composition.

13. A method of imparting a synthetic meat flavor to a food product which consists essentially of admixing with the food product a minor proportion of the reaction product produced by the process of claim 1.

14. A method of imparting a synthetic meat flavor to a food product containing naturally occurring ribonucleotides, said food selected from a torula yeast, mushrooms or meat or fish, which consists essentially of adding to said food, an amino acid selected from the group consisting of cysteine and cystine and heating the mixture in the presence of water.

15. A method for imparting a synthetic meat flavor to a food product which consists essentially of admixing with the food product a proportion of the reaction product produced by the process of claim 1.

16. A method for development of a chicken meat flavor according to claim 1 which includes adding to the reaction product thereof a mixture of 10 parts 2,4 decadienal, 1 part 2,6 nonadienal, 1 part undecanal and 1 part methyl sulphide.

References Cited

UNITED STATES PATENTS 3,394,017   7/1968   Giacino _____ 99—140

FOREIGN PATENTS 659,256   5/1965   Belgium.

OTHER REFERENCES

Chem. Abstracts, "Artificial Meat Flavoring Agents for Foods," vol. 64 (1966).

Lineweaver, et al.: "Chromatography of Chicken Flavor Volatiles," Chem. Abstracts, vol. 58 (1963).

Patton, et al.: "n-Deca-2,4, Dienal, Its Origin From Linoleate and Flavor Significance in Fats," The Journal of the American Oil Chemists' Society, vol. 36, pp. 280–283, 1959.

Pippen et al.: "Characterization of Volatile Nitrogen and Volatile Sulfur Fractions of Cooked Chicken and Their Relation to Flavor," Food Technology, January 1957, pp. 53–56.

A. LOUIS MONACELL, Primary Examiner

W. R. BOVEE, Assistant Examiner